United States Patent
Mildner et al.

(10) Patent No.: US 8,636,314 B2
(45) Date of Patent: Jan. 28, 2014

(54) FRAME STRUCTURE FOR A MOTOR VEHICLE, REAR FRAME STRUCTURE, AND VEHICLE BODY

(75) Inventors: Udo Mildner, Limburg (DE); Stanislaw Klimek, Frankfurt am Main (DE)

(73) Assignee: GM Global Technology Operations LLC, Detroit, MI (US)

( * ) Notice: Subject to any disclaimer, the term of this patent is extended or adjusted under 35 U.S.C. 154(b) by 72 days.

(21) Appl. No.: 13/305,854

(22) Filed: Nov. 29, 2011

(65) Prior Publication Data

US 2012/0139297 A1 Jun. 7, 2012

(30) Foreign Application Priority Data

Dec. 3, 2010 (DE) .......................... 10 2010 053 464

(51) Int. Cl.
*B60J 7/00* (2006.01)
(52) U.S. Cl.
USPC ......................................................... 296/204
(58) Field of Classification Search
USPC ................... 296/204, 210, 205, 187.09, 178, 296/193.07; 14/73, 74.5, 77.1, 6; 280/781, 280/784; 180/68.5; 52/650.1, 263, 745.2; 293/132
See application file for complete search history.

(56) References Cited

U.S. PATENT DOCUMENTS

| 1,821,657 A * | 9/1931 | Martin ........................... 180/359 |
| 1,855,734 A * | 4/1932 | Tarbox ....................... 296/203.01 |
| 2,045,166 A * | 6/1936 | Robinson et al. .......... 296/182.1 |
| 2,254,457 A * | 9/1941 | Swallow .................. 296/203.01 |
| 2,380,031 A * | 7/1945 | Lindsay et al. .......... 296/203.02 |
| 2,668,722 A * | 2/1954 | Muller .......................... 280/792 |
| 2,788,223 A * | 4/1957 | Mersheimer et al. ......... 280/800 |
| 2,908,528 A * | 10/1959 | Richter ....................... 296/181.4 |
| 4,355,844 A * | 10/1982 | Fantini Muzzarelli ....... 296/205 |
| 4,573,734 A * | 3/1986 | Gass ........................ 296/187.09 |
| 4,781,398 A | 11/1988 | Uebelstadt et al. |

(Continued)

FOREIGN PATENT DOCUMENTS

DE 2845548 A1 4/1980
DE 19720640 A1 10/1997

(Continued)

OTHER PUBLICATIONS

UK IPO, British Search Report for Application No. 1120176.1, dated Mar. 21, 2012.

(Continued)

*Primary Examiner* — Kiran B Patel
(74) *Attorney, Agent, or Firm* — Ingrassia Fisher & Lorenz, P.C.

(57) ABSTRACT

A frame structure is provided for a motor vehicle having at least two longitudinal girders, each having a first longitudinal section and a second longitudinal section, which are at an angle to one another, so that in the installed state of the frame structure in a motor vehicle, the first longitudinal section lies essentially horizontally below a floor plate of the vehicle body and the second longitudinal section extends essentially upward and, viewed in the forward travel direction, the first longitudinal section is arranged behind the second longitudinal section. It is provided that beginning in the area of the transition from the second longitudinal section to the first longitudinal section or an area adjacent thereto, the longitudinal girders extend at least partially away from one another in the direction of the first longitudinal section. Furthermore, the invention relates to a rear frame structure and a vehicle body.

4 Claims, 8 Drawing Sheets

(56) References Cited

U.S. PATENT DOCUMENTS

| | | | | |
|---|---|---|---|---|
| 4,900,082 | A * | 2/1990 | Schwuchow et al. | 296/203.02 |
| 5,346,276 | A | 9/1994 | Enning et al. | |
| 6,193,273 | B1 * | 2/2001 | Novak et al. | 280/781 |
| 6,203,099 | B1 * | 3/2001 | Iwatsuki | 296/204 |
| 6,328,377 | B1 * | 12/2001 | Makita et al. | 296/205 |
| 6,332,642 | B1 * | 12/2001 | Hanyu | 296/203.02 |
| 6,428,046 | B1 * | 8/2002 | Kocer et al. | 280/781 |
| 6,688,676 | B1 * | 2/2004 | Sato | 296/187.05 |
| 6,981,736 | B2 * | 1/2006 | Morsch et al. | 296/193.07 |
| 7,270,369 | B2 * | 9/2007 | Okana et al. | 296/204 |
| 7,810,878 | B2 * | 10/2010 | Nakamura et al. | 296/203.02 |
| 8,342,596 | B2 * | 1/2013 | Mildner et al. | 296/187.09 |
| 8,398,158 | B2 * | 3/2013 | Mildner et al. | 296/193.07 |
| 2010/0171340 | A1 * | 7/2010 | Yasuhara et al. | 296/205 |
| 2011/0266838 | A1 * | 11/2011 | Leopold | 296/193.07 |
| 2012/0068499 | A1 * | 3/2012 | Mildner et al. | 296/193.07 |
| 2012/0119542 | A1 * | 5/2012 | Mildner et al. | 296/187.09 |
| 2012/0119544 | A1 * | 5/2012 | Mildner et al. | 296/193.07 |
| 2012/0119545 | A1 * | 5/2012 | Mildner et al. | 296/193.07 |

FOREIGN PATENT DOCUMENTS

| | | |
|---|---|---|
| DE | 19632712 A1 | 2/1998 |
| DE | 19651627 A1 | 6/1998 |
| DE | 19808392 A1 | 3/1999 |
| DE | 102004053258 A1 | 5/2006 |
| DE | 102006012629 A1 | 10/2007 |
| DE | 102006052381 A1 | 5/2008 |
| DE | 602005003418 T2 | 9/2008 |
| DE | 102007006722 A1 | 12/2008 |
| DE | 102008019593 A1 | 10/2009 |
| EP | 0233505 B1 | 5/1990 |
| EP | 1564058 A1 | 8/2005 |
| GB | 797137 A | 6/1958 |

OTHER PUBLICATIONS

German Patent Office, German Search Report for Application No. 102010053464.1, dated Aug. 11, 2011.

* cited by examiner

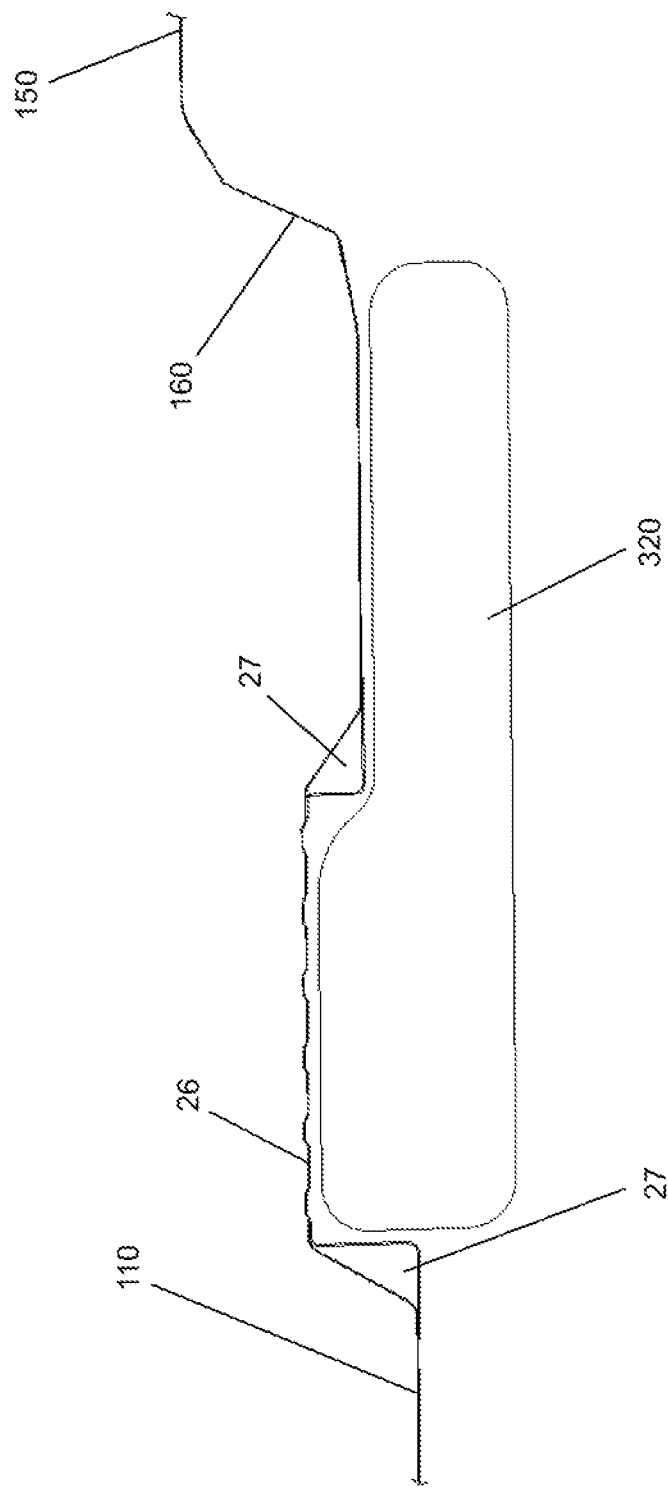

FRAME STRUCTURE FOR A MOTOR VEHICLE, REAR FRAME STRUCTURE, AND VEHICLE BODY

CROSS-REFERENCE TO RELATED APPLICATION

This application claims priority to German Patent Application No. 10 2010 053 464.1, filed Dec. 3, 2010, which is incorporated herein by reference in its entirety.

TECHNICAL FIELD

The technical field relates to a frame structure for a motor vehicle having at least two longitudinal girders, each having a first longitudinal section and a second longitudinal section, which are at an angle to one another, so that in the installed state of the frame structure in a motor vehicle, the first longitudinal section lies essentially horizontally below a floor plate of the vehicle body and the second longitudinal section extends essentially upward and, viewed in the forward travel direction, the first longitudinal section is situated behind the second longitudinal section. Furthermore, the invention relates to a rear frame structure for a motor vehicle. Furthermore, the invention relates to a vehicle body.

BACKGROUND

In the development of future vehicle generations, the ever-stricter legal standards for $CO_2$ emission toward ever-lower emission values are taken into consideration. This is achievable, inter alia, by an ever more extensive weight reduction of the motor vehicles. Simultaneously, the future vehicle generations must meet the legal requirements for occupant protection, which require a sufficiently reinforced passenger compartment of the motor vehicle. In addition, the different drive technologies, which will be available in future on the market, are taken into consideration. Future vehicle generations are no longer designed only for an internal combustion engine, but rather must also be suitable for an electric motor or for a combination of internal combustion engine and electric motor.

To be able to provide a high degree of variability with respect to the drive technology in the future vehicle generations, it is necessary for the vehicle body structure to be designed to house all of these drive variants and their components required for this purpose, for example, the fuel tank, and/or the batteries. Development and/or manufacturing costs may be saved. However, the previously known motor vehicles have a vehicle body structure which does not satisfactorily allow the housing of the drive variants in this variability. Voluminous components of the drive system, such as the fuel tank, muffler, and/or a catalytic converter of the exhaust system, currently may not be housed below the floor plate of the motor vehicle, since longitudinal girders of the frame structure for the vehicle body are situated therein in such a manner that sufficient installation space for this purpose has previously not been provided.

At least one object of providing a frame structure for a motor vehicle having the features mentioned at the beginning, by which the most flexible possible arrangement of components, such as tank, batteries, exhaust system, universal shaft, and/or fuel lines or brake lines can be implemented below the floor plate of the vehicle body. Components of different drive technologies are also to be able to be housed below the floor plate in a flexible manner. Furthermore, a vehicle body is to be proposed, which is suitable for the installation of such a frame structure. In addition, other objects, desirable features, and characteristics will become apparent from the subsequent summary and detailed description, and the appended claims, taken in conjunction with the accompanying drawings and this background.

SUMMARY

A frame structure is provided for a motor vehicle has at least two longitudinal girders, which each have a first longitudinal section and a second longitudinal section, which are at an angle to one another, so that in the installed state of the frame structure in a motor vehicle, the first longitudinal section lies essentially horizontally below a floor plate of the vehicle body, in particular the front floor plate of the vehicle body, and the second longitudinal section extends essentially upward and, viewed in the forward travel direction, the first longitudinal section is situated behind the second longitudinal section. Beginning in the area of the transition from the second longitudinal section to the first longitudinal section or an area adjacent thereto, the longitudinal girders extend at least partially away from one another in the direction of the first longitudinal section. Through this measure, the longitudinal girders of the frame structure are implemented in such a manner that sufficient installation space is provided between the longitudinal girders to be able to house relatively large components of the drive unit, such as the fuel tank, the exhaust system, in particular the muffler and/or the catalytic converter of the exhaust system, fuel lines, and/or brake lines therein optimally in a flexible manner. The possibility is also thus advisable of arranging components of drive technologies other than the internal combustion engine, such as the batteries for an electric drive of the motor vehicle, between the longitudinal girders of the frame structure, since the course of the longitudinal girders according to the invention now provides sufficient installation space for this purpose. Furthermore, it is possible through the measure, in a vehicle body, to raise the floor plate that is arranged between the front and rear fastening points for the front seats of the motor vehicle, in order to generate space for components below the floor plate.

The frame structure is particularly suitable for a vehicle body that has a relatively large ground clearance. Such motor vehicles are, for example, motor vehicles having an elevated seat position, for example, sport utility vehicles, four-by-fours, or minivans. In these motor vehicles having high ground clearance, the installation of the components of the drive systems, for example, a fuel tank or a drive battery, is advisable in particular, since in addition to the installation space provided according to the invention between the longitudinal girders of the frame structure, sufficient installation space is also available in the direction of the road.

It is advisable for the longitudinal girders to have the extension extending away from one another from the area of the front wall of the motor vehicle. The second longitudinal section of the longitudinal girders, which is arranged diagonally to the first longitudinal section and is still located in area of the floor plate, is located in the area of the vehicle front wall when the frame structure is integrated in the vehicle body. The longitudinal girders are thus producible relatively simply in this regard and simultaneously have the course extending away from one another in their longitudinal section, which spans the floor plate in the installed state. It is therefore advisable for the longitudinal girders to extend away from one another in the area of the first section.

According to an embodiment, it is provided that the longitudinal girders extend away from one another in a curve. A harmonic transition from those longitudinal sections of the frame structure, which preferably extend essentially at an equal distance to one another, and those longitudinal sections of the frame structure, which extend away from one another is thus implemented. Through this curved course of the longitudinal girders, sharp transitions on the longitudinal girders, which are susceptible to fracture, are avoided, which experience has shown result in undesired damage to the frame structure in case of a crash, in particular in case of a side impact.

According to an embodiment, it is provided that starting from the second longitudinal section and the adjoining first longitudinal section; the longitudinal girders each open into an end section, which is implemented for attachment to a lateral sill structure of a vehicle body. Through the end section of the longitudinal girders, which is attachable to the sill structure, in the installed state of the frame structure in the motor vehicle, an improved load introduction into the vehicle body structure results in the case of a laterally offset frontal or rear impact, whereby intrusions into the passenger compartment are reduced. To be able to attach the end section of the longitudinal girders optimally to an essentially linear sill structure, the end section extends essentially linearly at least on its outer side.

A particularly stable cross-sectional contour of the end section can be generated in that the end section is implemented as essentially L-shaped in cross-section. Through this L-shaped profile of the end section, in the installed state of the frame structure in the vehicle body, a structure that is closed in cross-section can be generated together with the sill structure, in particular if the sill structure also has an essentially L-shaped cross-section. Through the structure which is closed in cross-section, a structure which is particularly stable with respect to a laterally offset frontal or rear impact results, through which the load introduction occurs particularly effectively in case of such an impact.

According to a further embodiment, it is provided that in the installed state of the frame structure, the end section for attachment to the sill structure extends starting approximately from at least one front body-side fastening point for the front seats up to approximately at least one rear body-side fastening point for the front seats. Thus, in the area in which the floor plate is located in the installed state of the frame structure in the vehicle body, a particularly stable composite can be implemented between the longitudinal girders and the respective sill structure arranged on the side. The floor plate of the vehicle body arranged in this area can be raised in relation to the further course of the vehicle floor, so that an enlarged installation space may thus be housed between the vehicle floor and the road for housing components of an internal combustion engine or other alternative drive technologies.

It is advisable for the frame structure to have at least one transverse structure, which is arranged between the longitudinal girders and is structurally connected to the longitudinal girders. This measure is directed to reducing the intrusion into the passenger compartment in the event of a lateral impact of the motor vehicle. The at least one transverse structure is preferably to be arranged in the area of the first longitudinal section of the longitudinal girder which, in the installed state of the frame structure, lies below the floor plate, in particular the front floor plate. Furthermore, it is advisable to arrange the at least one transverse structure or further transverse structures in the area of the end section of the longitudinal girders, so that in the event of a lateral impact of the motor vehicle, a load introduction via the lateral sill and the end section of one longitudinal girder arranged structurally thereon can also be transmitted via the transverse structure to the other longitudinal girder and thus an optimal load distribution occurs over the entire vehicle body, in particular the entire frame structure of the motor vehicle. To be able to implement the simplest possible construction of the vehicle body, the course of the longitudinal girders is to be essentially mirror-symmetrical with respect to a central longitudinal axis of the frame structure.

According to an embodiment, the frame structure is to form a front frame structure for the vehicle body of a motor vehicle. The second longitudinal section of the longitudinal girders thus forms a receptacle or a carrier for the forward front wall plate, which extends upward from the floor of the vehicle body. It is advisable for a further longitudinal section, which protrudes into the engine compartment of the motor vehicle or the vehicle body, is arranged between the drive components and the front wheels, and therefore forms a carrier structure for the drive unit, to be connected upstream from the second longitudinal section of each of the longitudinal girders.

According to a further embodiment, a rear frame structure is provided for a motor vehicle. The rear frame structure has at least two longitudinal girders, which are implemented for connection to the longitudinal girders of a frame structure of the above-described type, in particular a front frame structure of the above-described type. According to a refinement of the rear frame structure, it is provided that, for the connection to the longitudinal girders of the front frame structure, the longitudinal girders of the rear frame structure each have an end section, which extends essentially linearly at least on the outside for attachment to a lateral sill structure. The rear frame structure thus supports the load introduction into the entire vehicle body in the event of a laterally offset frontal or rear impact, in that the rear frame structure is optimally structurally connected over a section to the sill structure by its essentially linear course. A reduced intrusion into the passenger compartment thus results in the event of a laterally offset frontal or rear impact.

It is advisable for the end section to be implemented as L-shaped in cross-section. A profile which is simple to implement is thus provided by the rear frame structure in the area of the end section of the longitudinal girders. The sill structure is preferably also implemented as essentially L-shaped in a corresponding way for this purpose, so that a closed hollow structure is formed in cross-section, which has a high level of bracing in the event of a lateral impact. If, in addition to the rear frame structure, the front frame structure also has an end section having an essentially L-shaped cross-section and the end section of the front frame structure can be structurally connected to the end section of the rear frame structure, for example, in that the end sections, which are each L-shaped in cross-section, are pushed one inside the other, a particularly stable side structure results together with the lateral sill structure, which offers particularly good load introduction into the entire vehicle body in the event of a lateral impact of the motor vehicle.

According to an embodiment of the rear frame structure, it is provided that the longitudinal girders of the rear frame structure extend away from one another at least on the inside in the direction of one end of the longitudinal girders at least over one longitudinal section. The longitudinal girders of the rear frame structure are preferably to extend away from one another, at least over one longitudinal section at least on the inside, in the direction of the end of the longitudinal girders connectable to the front frame structure. The distance of the longitudinal girders of the rear frame structure to the longitudinal girders of the front frame structure is thus enlarged, so that through the enlargement of the distance, an enlarged installation space for housing components of the internal combustion engine and components of alternative drive technologies is already implemented by the longitudinal girders of the rear frame structure. For example, a fuel tank for an internal combustion engine or a battery block for an electric drive can readily be arranged between the longitudinal girders of front frame structure and rear frame structure.

Furthermore, a vehicle body is provided that has a frame structure of the above described type, which is preferably a front frame structure. The vehicle body preferably additionally has a rear frame structure as described above, which is connected to the front frame structure. In another embodiment, in the vehicle body, for the longitudinal girders of the front frame structure to extend outward in the direction toward the sill structure of the vehicle body, in particular to be structurally connected to the sill structure. An improved load introduction into the vehicle body structure thus results in the event of a laterally offset frontal or rear impact, whereby intrusions into the passenger compartment are reduced.

The rear frame structure is preferably additionally also to extend up to the sill structure and be connected to the sill structure. The attachment of the front frame structure to the sill structure is to begin approximately in the area of the at least one front body-side fastening point for the front seats of the motor vehicle and extend at least approximately up to the at least one rear body-side fastening point for the front seats. The floor plate of the vehicle body, which extends from the front fastening point essentially up to the rear fastening point, can thus be raised. The raising of the floor plate or floor plate section in this area is covered by the front seats and therefore does not protrude annoyingly into the passenger compartment. In addition, additional installation space below the floor plate is implemented by the raised floor plate section in relation to the further floor of the vehicle body, which can be used for housing components, for example, for the vehicle drive, such as a fuel tank, batteries for an electric motor, or the like.

It is advisable for the front frame structure and the sill structure to form a profile, which is closed in cross-section. Such a profile, which is preferably box-shaped, has a high stiffness and allows an optimum load introduction into the entire vehicle body in the event of a laterally offset frontal or rear impact of the motor vehicle. In that the profile, which is closed in cross-section, is first generated by the sill structure, the front frame structure can first be structurally connected to the rear frame structure in a particularly simple way, for example, by means of welding, without additional holes in the floor plate being required for this purpose, which would result in structural weakening of the vehicle body.

After the structural connection of the front frame structure to the rear frame structure, for example, when the longitudinal girders of the front frame structure and the rear frame structure have an end section which is L-shaped in cross-section, on which the two frame structures are connected to one another, in a subsequent work step, the closed profile, which is box-shaped in cross-section, is producible in a simple way by welding onto a corresponding lateral sill profile.

The components of the motor vehicle having a relatively large space requirement, such as the fuel tank, the battery for a drive, and possibly fuel and brake lines, may be situated below the floor structure of the motor vehicle better than previously by the invention. In addition, in the event of a frontal impact or a laterally offset impact of the motor vehicle, an improved force introduction into the vehicle body results, so that intrusions into the passenger compartment are reduced. Furthermore, the weight of the motor vehicle can be reduced by the invention. Cost advantages also result over the previously implemented frame structures and vehicle bodies. Through the possibility of the structural connection of the front frame structure and the rear frame structure to the sill structures arranged on both sides, a simplification of the assembly sequence additionally results.

BRIEF DESCRIPTION OF THE DRAWINGS

The present invention will hereinafter be described in conjunction with the following drawing figures, wherein like numerals denote like elements, and:

FIG. 8 shows a sectional view through the vehicle body according to FIG. 7 along section line B-B according to FIG. 7 in the area of the tank.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
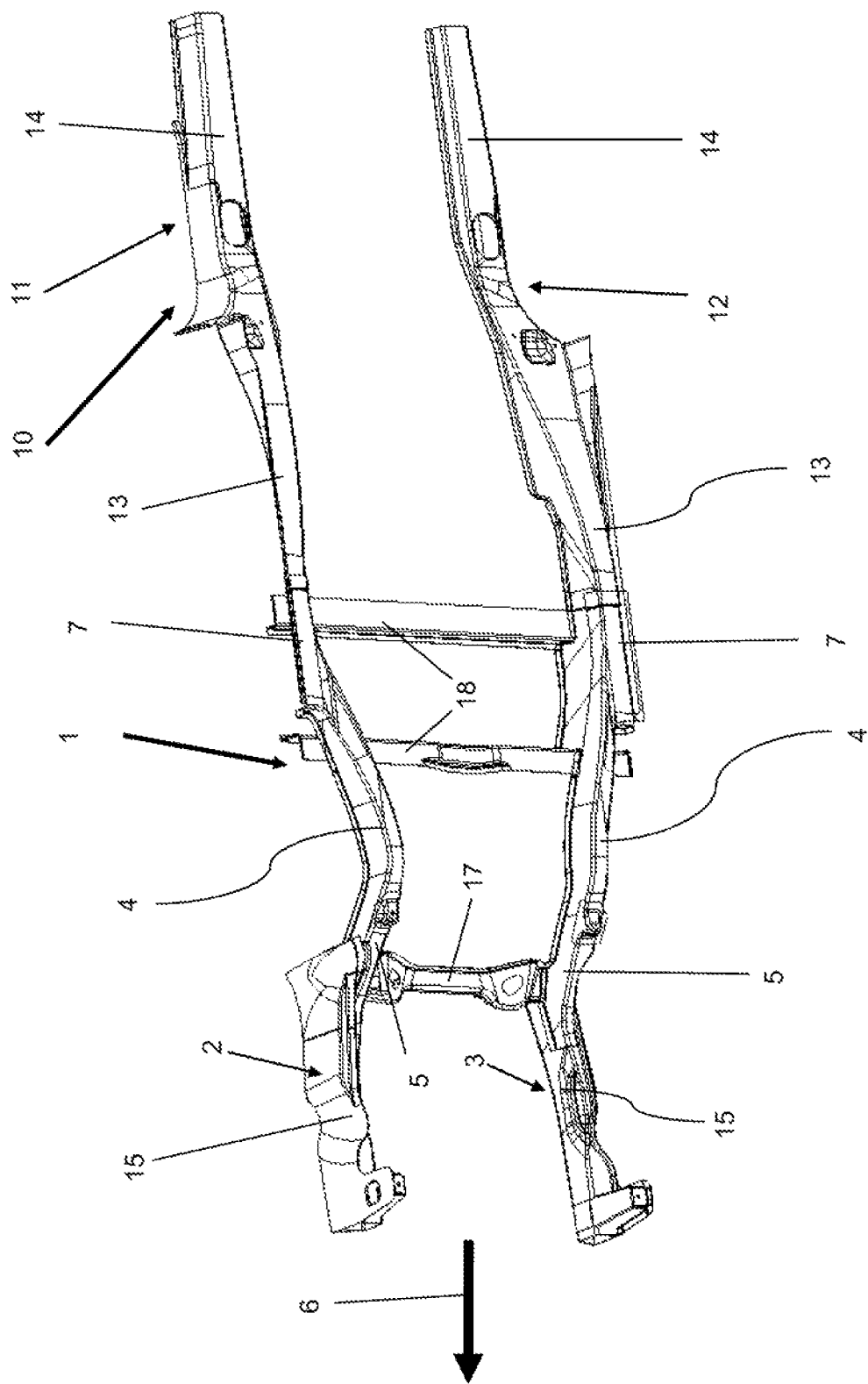
FIG. 1 shows a possible embodiment of a front frame structure and a rear frame structure for the vehicle body of a motor vehicle in a perspective view from below.

FIG. 1 shows, in a schematic view, the longitudinal girders 2, 3 of a frame structure 1, which preferably forms the front frame structure of a vehicle body (not shown). The longitudinal girders 2, 3 each have a first longitudinal section 4 and a second longitudinal section 5, which are at an angle to one another, so that in the installed state of the frame structure 1 in the motor vehicle (not shown), the first longitudinal section 4 lies essentially horizontally below a front floor plate (not shown) of the vehicle body and the second longitudinal section 5 extends essentially upward and the first longitudinal section 4 is arranged behind the second longitudinal section 5 viewed in the forward travel direction 6. The longitudinal girders 2, 3 each additionally have a further longitudinal section 15 which, in the installed state of the front frame structure 1, protrudes into the engine compartment (not shown) of the motor vehicle and is preferably arranged therein between the engine components and the front wheels of the motor vehicle.

In the installed state of the front frame structure 1 in the motor vehicle (not shown), the further longitudinal section 15 of the longitudinal girders 2, 3 is arranged essentially horizontally and is preferably located on a higher level in relation to the first longitudinal section 4. The second longitudinal section 5 of the longitudinal girders 2, 3, which adjoins the further longitudinal section 15, preferably extends diagonally downward from the upper level and leads into the first longitudinal section 4 of the longitudinal girders 2, 3, which, in the installed state of the front frame structure 1, extends essentially horizontally to the rear, i.e., opposite to the forward travel direction 6.

An end section 7 adjoins the first longitudinal section 4 of the longitudinal girders 2, 3 in each case. The longitudinal girders 2, 3 are each structurally connected to longitudinal girders 11, 12 of a rear frame structure 10 via the end section 7. The longitudinal girders 11, 12 of the rear frame structure 10 each have an end section 13, which faces toward the end section 7 of the front frame structure 1, the end section 7 and the end section 13 being structurally connected to one another and thus generating the connection between the front frame structure 1 and the rear frame structure 10. The longitudinal girders 11, 12 of the rear frame structure 10 each have, in addition to the end section 13, at least one longitudinal section 14 that adjoins the end section 13.

Figure 2:
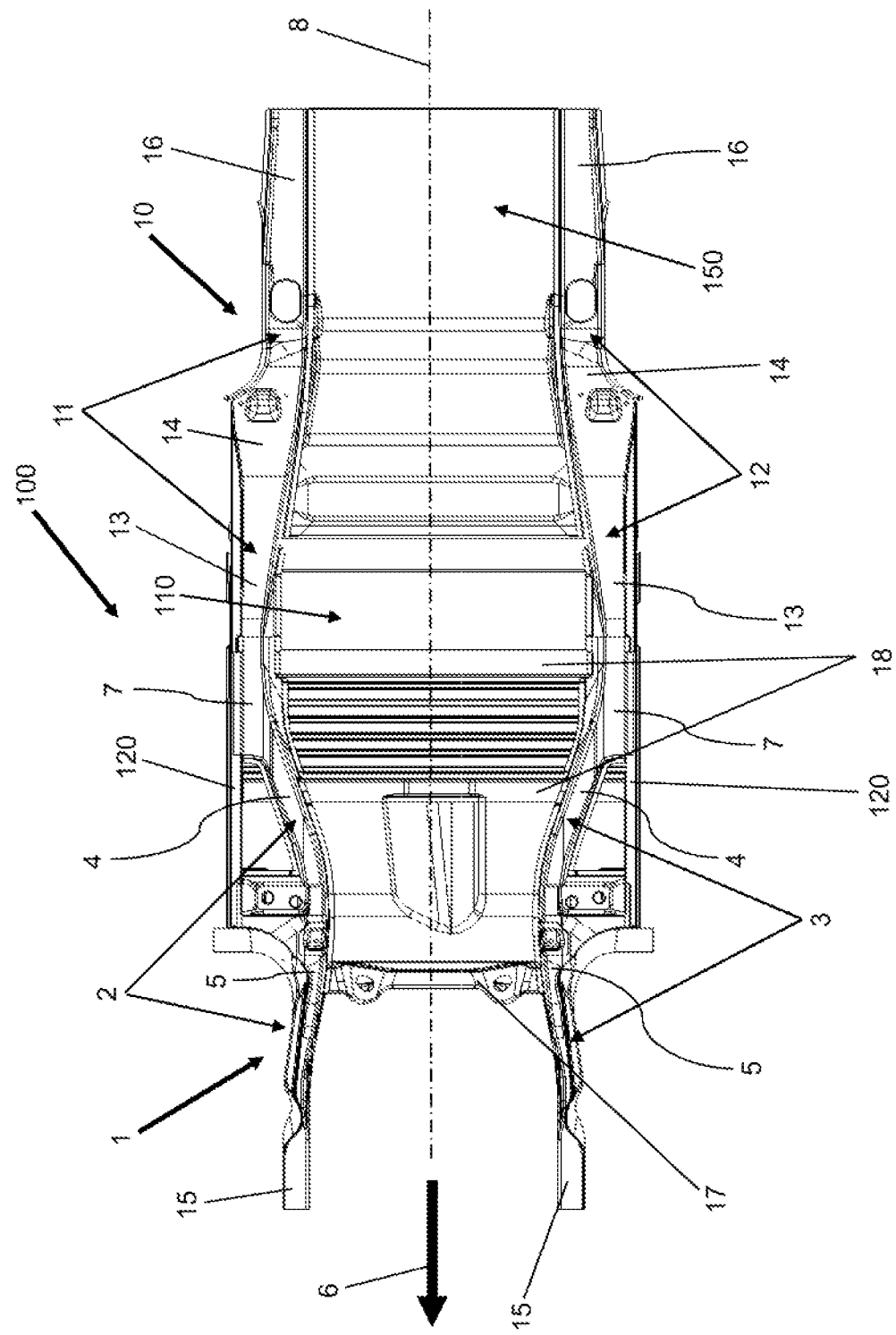
FIG. 2 shows the front frame structure and the rear frame structure according to FIG. 1 installed in a vehicle body in a bottom view.

FIG. 2 shows the front frame structure 1 and the rear frame structure 10 installed in a vehicle body 100 in a view from below. The fashion of the course of the longitudinal girders 2, 3 of the front frame structure 1 is obvious based on FIG. 2 in combination with FIG. 1. Beginning in the area of the transition from the second longitudinal section 5 to the first longitudinal section 4, the longitudinal girders 2, 3 of the front frame structure 1 each extend away from one another in the direction toward the end section 7, the longitudinal girders 2, 3 preferably having the greatest distance to one another in the area of their respective end section 7. The end section 13 of the longitudinal girders 11, 12 of the rear frame structure 10 adjoins the end section 7 of the longitudinal girders 2, 3 in each case.

The longitudinal girders 11, 12 of the rear frame structure 10 have the greatest distance to one another in the area of the end section 13. The longitudinal girders 11, 12 preferably already extend toward one another in the area of the end section 13, at least on their sides facing toward one another and at least over a further longitudinal section 14, and each lead into a longitudinal section adjoining thereon, over which the longitudinal girders 11, 10 extend at essentially equal distance to one another. The longitudinal section 16 preferably begins in the area of the rear spring struts of the motor vehicle (not shown) and preferably extends up to its rear.

As can be seen from FIG. 2 in particular, the longitudinal girders 2, 3 of the front frame structure 1 and the longitudinal girders 11, 12 of the rear frame structure 10 extend essentially mirror-symmetrically to one another with respect to a central longitudinal axis 8 of the vehicle body 100 and extend from the front area up to the rear area of the vehicle body 100. The longitudinal girders 2, 3 of the front frame structure 1 extend at essentially equal distance to one another beginning from the longitudinal section 15 in the area of the engine compartment and then merge into the second longitudinal section 5, in which the longitudinal girders 2, 3 begin to extend toward one another and extend with this course over the area of the vehicle front wall (not shown), which is indicated in FIG. 2 at least on the basis of a front wall crossbeam 17 provided there. The front wall crossbeam 17 is also obvious in FIG. 1. Viewed in this longitudinal direction, namely viewed opposite to the forward travel direction 6, the longitudinal girders 2, 3 have the smallest distance to one another in the area after the front wall crossbeam 17, the longitudinal girders 2, 3 then extending away from one another in their course over the first longitudinal section 4 up to the end section 7.

The longitudinal girders 2, 3 of the front frame structure 1 extend, in their course in the direction of the central longitudinal axis 8, essentially over at least one section like a curve, in particular the course of the longitudinal girders 2, 3 of the front frame structure 1 from the area of the vehicle front wall (not shown), i.e., approximately from the front wall crossbeam 17, is a harmonic course outward up to a sill structure 100, which is located laterally on the outer side on both sides of the vehicle body 100. The curved course of the longitudinal girders 2, 3 of the front frame structure 1 preferably merges into a curved course of the longitudinal girders 11, 12 of the rear frame structure 10 and then leads into an essentially linear course of the longitudinal section 16 of the longitudinal girders 11, 12, which extends up to the rear of the vehicle body 100.

As is obvious from FIG. 1 and FIG. 2 in particular, to brace the vehicle body 100, the front frame structure 1 preferably has further transverse structures 18, which are arranged between the longitudinal girders 2, 3 of the front frame structure 1 and are structurally connected to the longitudinal girders 2, 3, in addition to the front wall crossbeam 17. Of course, transverse structures can also be provided in the area of the longitudinal girders 11, 12 of the rear frame structure 10 to brace the vehicle body 100 in the area of the rear frame structure 10.

Figure 3:
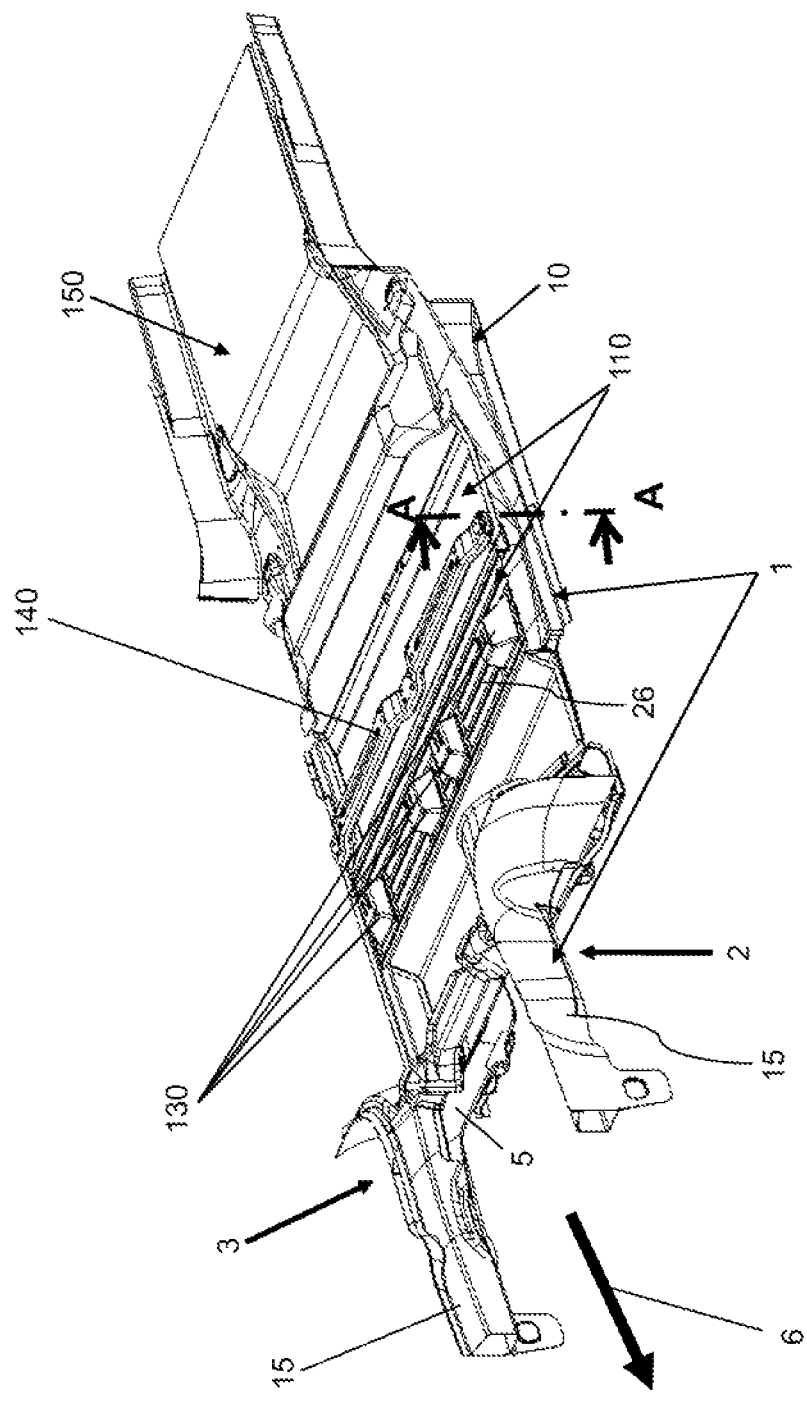
FIG. 3 shows the vehicle body according to FIG. 2 having the front frame structure and the rear frame structure in a perspective view from above.

FIG. 3 shows the vehicle body 100 in a perspective view from above. As is obvious therefrom, the front frame structure 1 and the rear frame structure 10 are at least partially overlapped by at least one, preferably at least two floor plates 110, 150, which are placed from above on the front frame structure 1 or the rear frame structure 10. The transverse structures 18 of the front frame structure 1 and/or any transverse structures of the rear frame structure 10 can be arranged below and/or above the floor plates 110, 150 of the vehicle body 100.

As is obvious from FIG. 2 in particular, the front frame structure 1 having its longitudinal girders 2, 3 is led up to the respective lateral sill structure 120 and preferably structurally connected in each case to the two lateral sill structures 120 using the end section 7. The rear frame structure 10 also extends, viewed transversely to the central longitudinal axis 8, with its longitudinal girders 11, 12 up to the respective lateral sill structure 120, the longitudinal girders 11, 12 of the rear frame structure 10 are preferably structurally connected to the lateral sill structure using their end section 13.

Furthermore, the longitudinal girders 2, 3 of the front frame structure 1 and the longitudinal girders 11, 12 of the rear frame structure 10 are preferably in turn structurally connected to one another at their end sections 7 and 13. A particularly good composite between the front frame structure 1 and the rear frame structure 10 as well as the lateral sill structures 120 thus results, so that an optimum load introduction into the vehicle body 100 is made possible in the event of a laterally offset frontal or rear impact.

Figure 4:
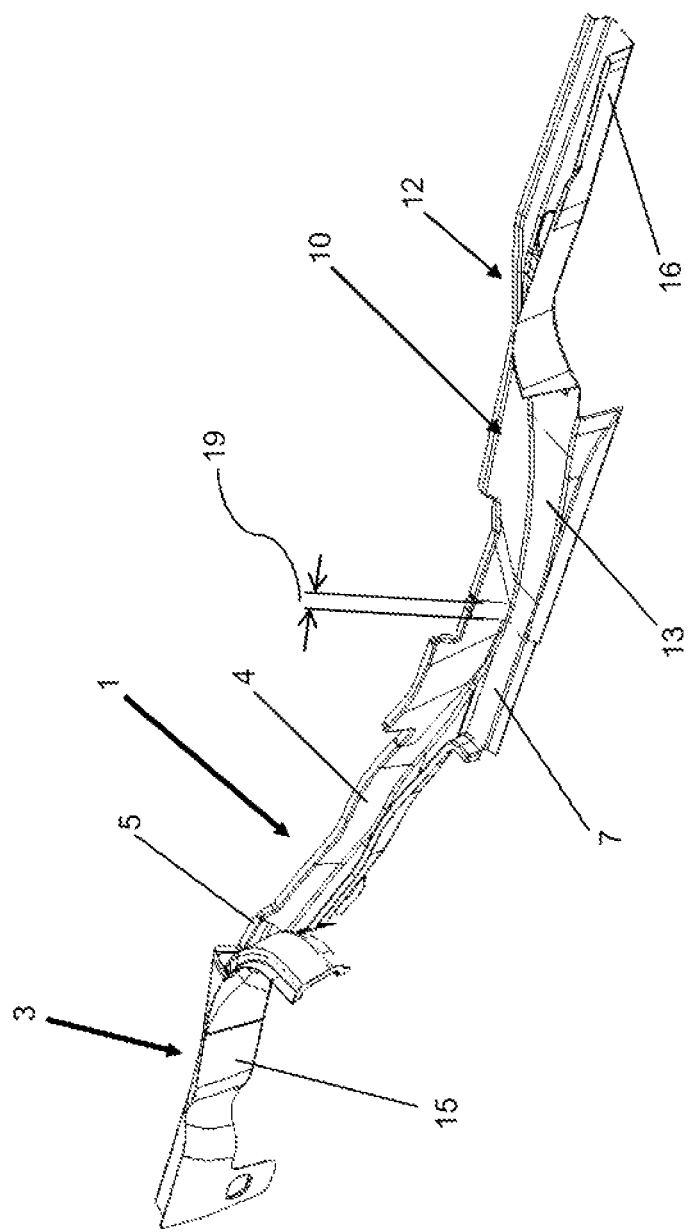
FIG. 4 shows a longitudinal girder of the front frame structure having a longitudinal girder, which is structurally connected thereto, of the rear frame structure of the vehicle body according to FIG. 2 and FIG. 3.

FIG. 4 shows the longitudinal girder 3 of the front frame structure 1 and the longitudinal girder 12 of the rear frame structure 10, which are structurally connected to one another at their respective end section 7 or 13. For this purpose, the end section 7 preferably has a cross-sectional profile essentially corresponding to the end section 13, so that the end section 7 can be overlapped with the end section 13 via a common area 19 and can overlap one another via this overlap area 19, in particular can be pushed one inside the other or rest one on top of the other, for the structural connection of the longitudinal girder 3 to the longitudinal girder 12.

Figure 5:
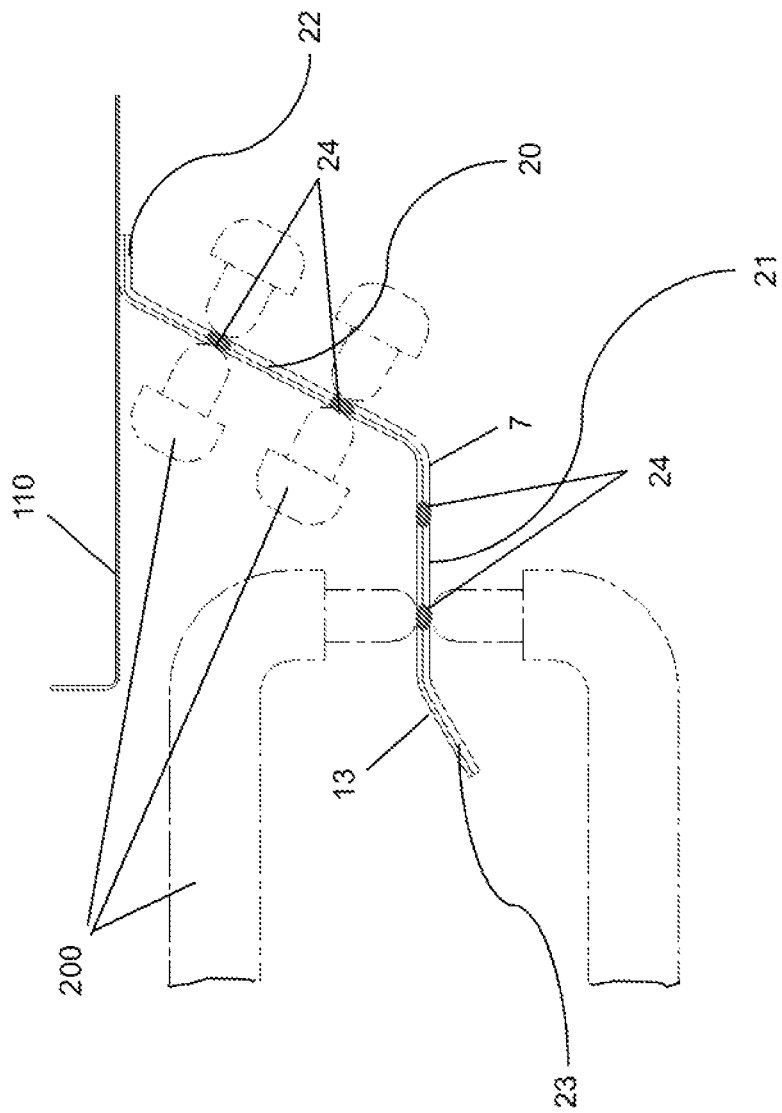
FIG. 5 shows a detail view in the area of the transition from one longitudinal girder of the front frame structure to one longitudinal girder of the one rear frame structure along section line A-A according to FIG. 3 having a welding tool shown as an example to illustrate the procedure during the structural connection of the two longitudinal girders.
Figure 6:
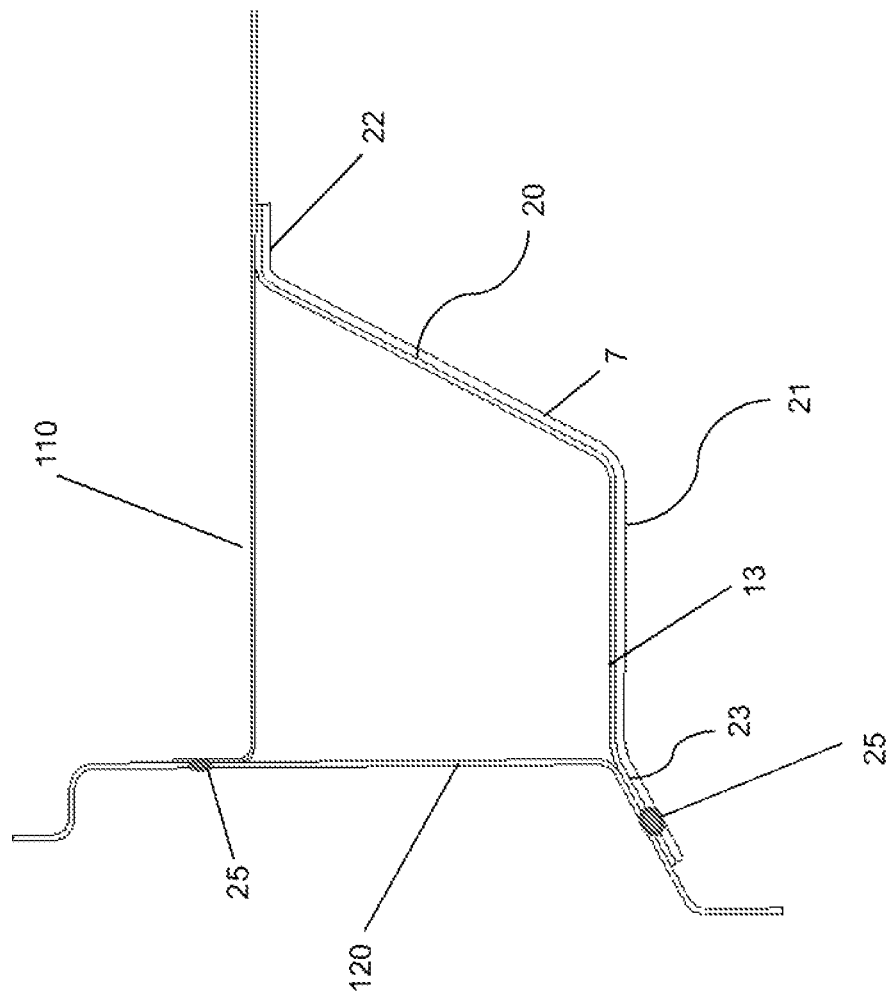
FIG. 6 shows a detail view of the longitudinal girders, which are structurally connected to one another, of front frame structure and rear frame structure along section line A-A according to FIG. 3 in the final installed state having welded-on inner sill structure.

The longitudinal girders 2, 3 of the front frame structure 1 are preferably implemented as essentially L-shaped in cross-section at least on their respective end section 7. FIG. 5 shows the contour of the end sections 7 and 13 of the longitudinal girders 2 and 11 on the example of a sectional view along section line A-A according to FIG. 3. The lateral sill structure 120 is omitted in FIG. 5, to illustrate the procedure during the structural connection, in particular welding, of the end sections 7 and 13 to one another.

As shown from FIG. 5, seen in cross-section, the end section 7 has two legs 20 and 21, which are at an angle to one another. The angle is in a range between approximately 90° and approximately 120°, the angle is preferably greater than approximately 90°. A material section 22, 23 adjoins each of the ends of the two legs 20, 21, the material section 22 protruding outward in relation to the leg 20 at an angle and the material section 23 protruding downward at an angle in relation to the leg 21. The material sections 22, 23 are used as flanges or welding flanges for fastening further components of the vehicle body 100, for example, the floor plate 110.

In the installed state of the front frame structure 1 and the rear frame structure 10 in the vehicle body 100, the material section 22 lies essentially horizontally. The leg 21 preferably also lies essentially horizontally, the material section 23 adjoining thereon being folded slightly downward. The shape of the end sections 7, 13 is preferably produced by forming, in particular bending or deep drawing or embossing. The end section 13 of the longitudinal girder 11, which corresponds in its cross-sectional contour to the end section 7, therefore also has the legs 20 and 21 and the material sections 22 and 23. Sufficient free space is implemented by this essentially L-shaped cross-sectional contour of the end sections 7 and 13 to be able to guide a welding tool 200 into the overlap area 19 of the end sections 7 and 13 in spite of already fastened floor plate 110 and to generate at least one structural connection 24 therein, for example, by means of welding, between the two end sections 7 and 13 and therefore between the longitudinal girders 7 and 11. Any feed openings in the floor plate 110 for the welding tool 200 can be avoided in this manner, so that structural weakening of the floor plate 110 because of such openings is also avoided.

After the structural connection of the front frame structure 1 to the rear frame structure 10, which is shown in FIG. 5 on the example of the connection of the longitudinal girders 2 and 11 via the end sections 7 and 13, in a subsequent method step, the essentially L-shaped profile in the area of the end sections 7 and 13 is structurally connected to the respective lateral sill structure 120, in particular, at least one structural connection 25 is generated by means of welding. The structural connection 25 is preferably generated between the lateral sill structure 120 and the material section 23 used as a flange and a second structural connection 25 is generated between the sill structure 120 and the floor plate 110. A profile that is closed in cross-section through the floor plate 110 is thus formed by the end sections 7, 13 of the longitudinal girders 2, 11 together with the lateral sill structure 120 on both sides of the vehicle body 100.

Figure 7:
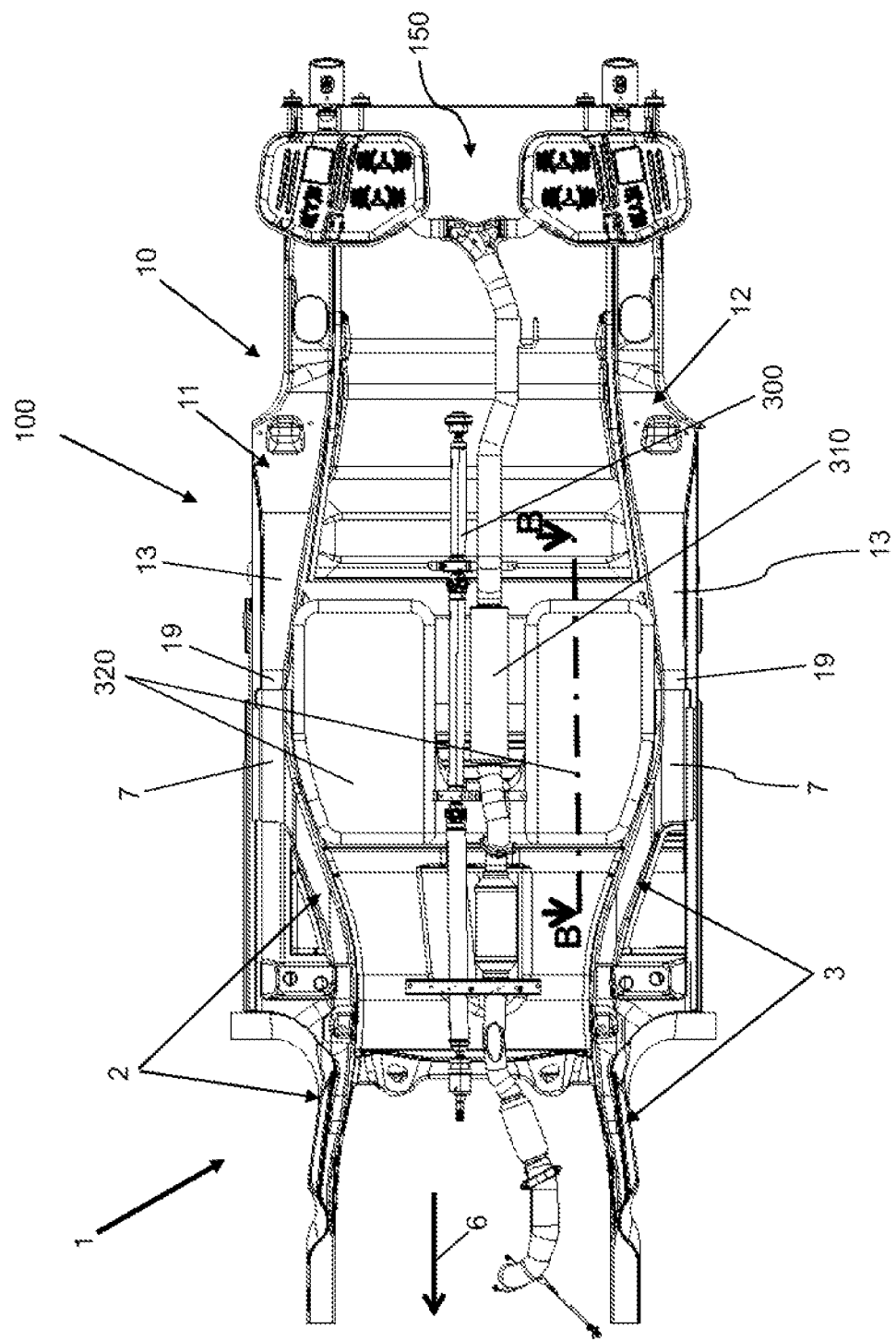
FIG. 7 shows a possible embodiment of a vehicle body having a front frame structure and a rear frame structure according to FIG. 2 and FIG. 3 having installed exhaust system, universal shaft, and fuel tank.

FIG. 7 shows the vehicle body 100 according to FIGS. 2 and 3 in a bottom view corresponding to FIG. 2, exemplary components of the drive system, such as a universal shaft 300, an exhaust system 310, and a tank 320, in particular a fuel tank, being shown in FIG. 7. FIG. 8 shows a section along section line B-B according to FIG. 7 in the area of the tank 320. As is obvious from FIG. 8, the floor plate or the front floor plate 110, which extends up to the heel plate 160 of the vehicle body 100, is implemented as elevated over a section 26, this floor plate section 26 preferably extending from the area of one lateral sill structure 120 up to the other lateral sill structure 120 of the vehicle body 100, as is obvious from FIG. 3 in particular.

An enlarged installation space volume is implemented by the elevated section 26, which can be used by a larger tank 320, for example, as is obvious from FIG. 8 in particular. The elevated section 26 is first made possible by the course of the longitudinal girders 2, 3 of the front frame structure 1 and the course of the longitudinal girders 11, 12 of the rear frame structure 10 in the area of the side sill structure 120, since at least one front fastening point 130 and at least one rear fastening point 140 for the front seats are located in this area, as is obvious from FIG. 3 in particular. The at least one front fastening point 130 and therefore the entire front seat is elevated by the elevated section 26. Such an elevated seat is advisable above all in motor vehicles such as minivans and four-by-fours.

Transverse structures 27 are preferably arranged on both sides on the transitions from the edge area of the floor plate 110 to the elevated section 26, in order to brace the elevated section 26 sufficiently. The transverse structures 27 preferably extend up to the area of the longitudinal girders 2, 3 of the front frame structure 1 and are preferably structurally connected thereto.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle body, comprising:
   a front frame structure, comprising:
   a first longitudinal girder; and
   a second longitudinal girder,
   wherein each of the first longitudinal girder and the second longitudinal girder comprises:
   a first end section having an essentially L-shaped cross section;
   a first longitudinal section adjacent to the end section; and
   a second longitudinal section at an angle to the first longitudinal section so that in an installed state of a frame structure, the first longitudinal section lies essentially horizontally below a floor plate of the vehicle body and the second longitudinal section extends essentially upward and, viewed in a forward travel direction, the first longitudinal section is arranged behind a rear longitudinal section,
   wherein beginning in an area of a transition from the second longitudinal section to the first longitudinal section the first longitudinal girder and the second longitudinal girder extend at least partially away from one another in a direction of the first longitudinal section; and
   a rear frame structure connected to the front frame structure, the rear frame structure comprising:
   a third longitudinal girder; and
   a fourth longitudinal girder,
   wherein each of the third longitudinal girder and the fourth longitudinal girder comprises:

a second end section having an essentially L-shaped cross section essentially corresponding with the L-shaped cross section of the first end section;

a third longitudinal section; and a fourth longitudinal section at a second angle to the third longitudinal section so that in the installed state of the frame structure, the third longitudinal section lies essentially horizontally below a second floor plate of the vehicle body and the fourth longitudinal section extends essentially upward and, viewed in the forward travel direction, the third longitudinal section is arranged behind the rear longitudinal section, and wherein beginning in the area of a second transition from the second longitudinal section to the first longitudinal section the third longitudinal girder and the fourth longitudinal girder extend at least partially away from one another in the direction of the first longitudinal section, and wherein the first longitudinal girder is connected to the third longitudinal girder at a first overlapping area of the first and second end sections of the first and third longitudinal girders, and wherein the second longitudinal girder is connected to the fourth longitudinal girder at a second overlapping area of the first and second end sections of the second and fourth longitudinal girders.

2. The vehicle body according to claim 1, wherein the third longitudinal girder and the fourth longitudinal girder of the front frame structure extend outward in the direction toward a sill structure of the vehicle body.

3. The vehicle body according to claim 2, wherein the third longitudinal girder and the fourth longitudinal girder are structurally connected to the sill structure.

4. The vehicle body according to claim 2, wherein the front frame structure and the sill structure form a profile that has a closed cross-section.

\* \* \* \* \*